W. VAN DEN PLAS.
FOLDING HOOD FOR AUTOMOBILES AND LIKE VEHICLES.
APPLICATION FILED JULY 29, 1912.
1,096,652.
Patented May 12, 1914.
2 SHEETS—SHEET 1.
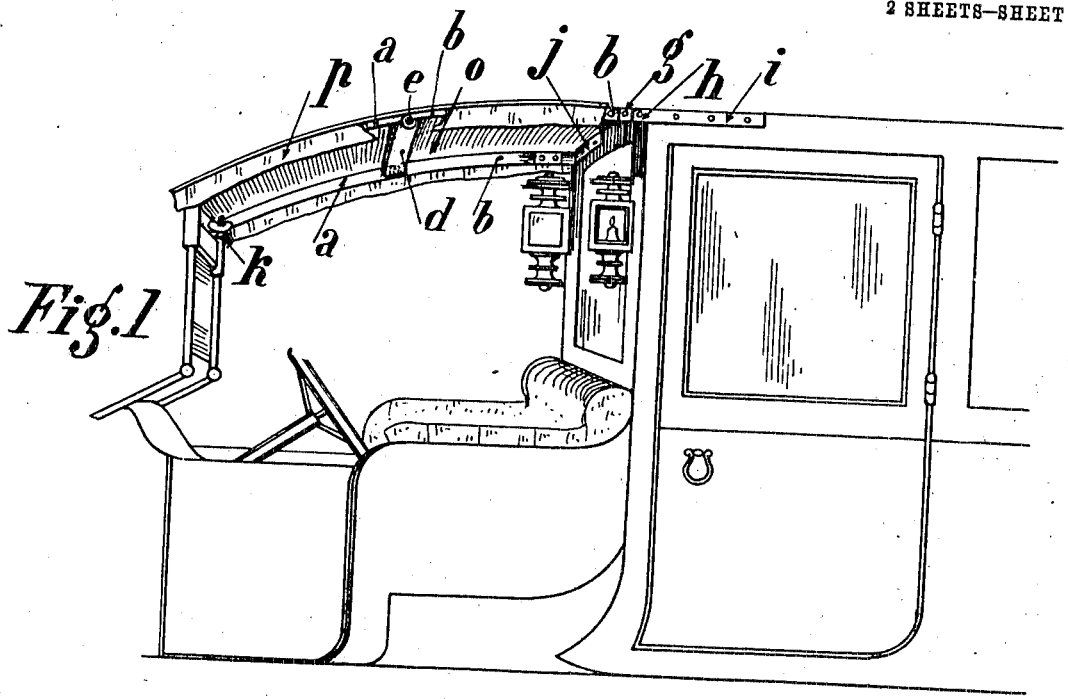
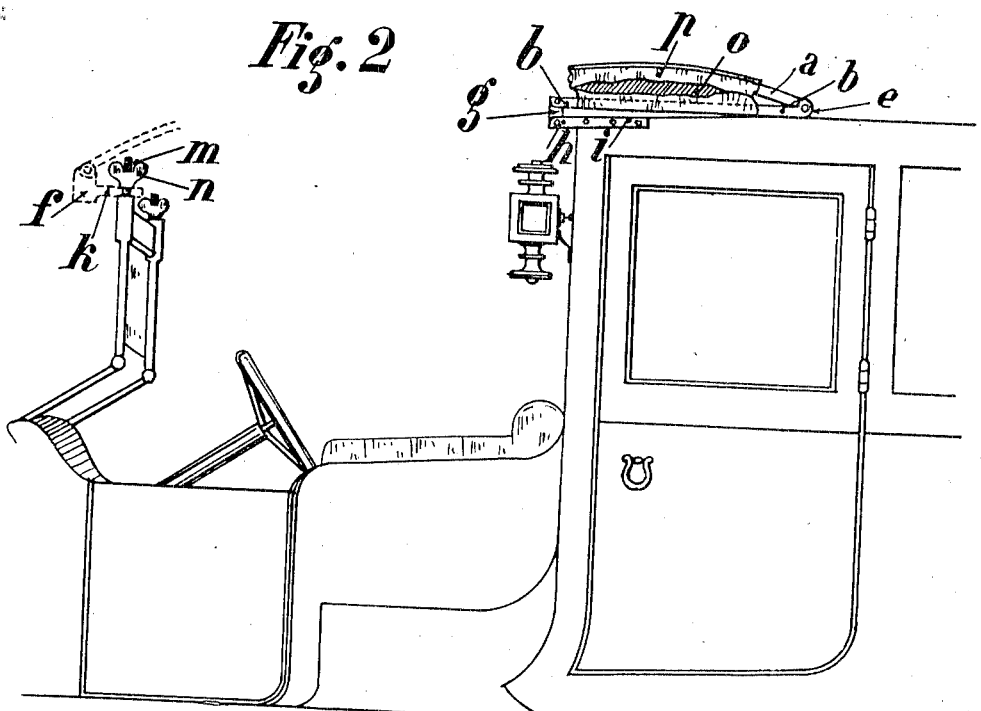

UNITED STATES PATENT OFFICE.

WILLY VAN DEN PLAS, OF WOLUWE, ST. PIERRE-LEZ-BRUSSELS, BELGIUM.

FOLDING HOOD FOR AUTOMOBILES AND LIKE VEHICLES.

1,096,652. Specification of Letters Patent. Patented May 12, 1914.

Application filed July 29, 1912. Serial No. 712,178.

*To all whom it may concern:*

Be it known that I, WILLY VAN DEN PLAS, residing at 32 Rue Saint-Michel, Woluwe, St. Pierre-lez-Brussels, Belgium, have invented new and useful Improvements in and Relating to Folding Hoods for Automobile and like Vehicles.

This invention relates to a hood or front canopy which can be folded upon itself and on the roof of the vehicle, which hood is more especially applicable for use with automobile vehicles.

By way of example one form of carrying out the object of the present invention is illustrated on the accompanying drawings, in which—

Figure 3:
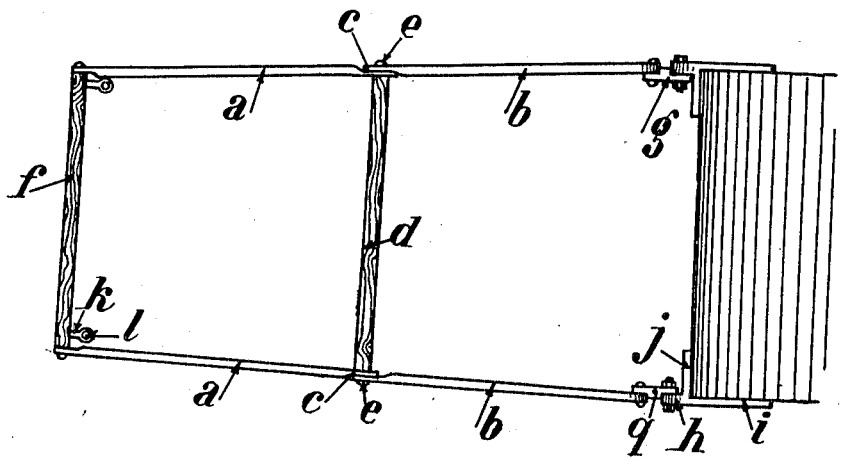
Figures 4, 5:
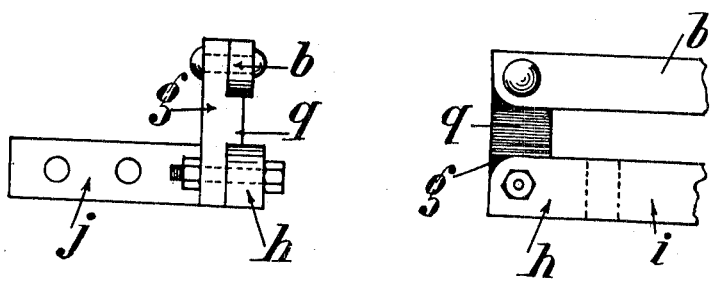

Figure 1 shows the hood completely extended or unfolded and fixed in front to the wind screen to form a canopy. Fig. 2 shows in side view the hood folded back upon itself and on the roof of the vehicle. Fig. 3 is a plan view of the linked frame-work of this hood, the leather or cloth cover being removed. Fig. 4 is a front view of one of the two linked joints or hinges attached to the frame-work of the vehicle. Fig. 5 is a view of the said hinge from the inside.

The hood is formed of a base or frame each longitudinal side of which is formed in two pieces $a$ $b$ hinged to one another at $c$ and held apart at the point $c$ by means of a cross member or stay $d$, at the extremities of which are arranged pivots $e$. The side members $a$ $a$ are also held apart in front by a cross stay $f$. The side members $b$ $b$ are fixed by links $g$ to stays $h$ fastened at the corners of the body of the vehicle by two plates $i$ $j$. The front stay or cross member $f$ carries at each end two lugs $k$ provided with an eyelet $l$ through which the screw end of each upright is secured by means of a wing nut or the like $n$.

The covering $o$ of the frame is of leather or impermeable cloth provided with a lower lining and overhanging edges at the sides and front.

When it is desired to fold the hood back upon itself, it is only necessary to disengage the two lugs $k$ after having unscrewed or removed the nuts $n$ and then to push back the sides $b$ $b$ upon the roof at the same time folding the sides $a$ $a$ as shown in Fig. 2.

The links $g$ have at their middle part either on the outside or inside an extension $q$ the faces of which serve as abutments for the ends of the bars $b$ and $h$ as shown in Fig. 5 when the hood is folded back, and as shown in Fig. 3 when the hood is unfolded or extended. The provision of this extension $q$ on the link $g$ prevents all vibration in this double hinge.

In the preferred shape the frame of the hood narrows toward the front as shown in Fig. 3, but the invention is not to be limited to this shape.

Having now particularly described and ascertained the nature of my said invention and in that manner the same is to be performed, I declare that what I claim is:—

The combination with a vehicle having a top; of a wind shield carried by the vehicle and comprising a frame having side members extending upwardly and provided with threaded terminal portions, a hood including a frame having its rear portion hinged to said top, lugs pivoted to the hood frame to swing in vertical planes and having vertical openings for the reception of the threaded terminal portions, and nuts on said terminal portions to secure the hood frame to the wind shield frame.

In testimony whereof I affix my signature in presence of two witnesses.

WILLY VAN DEN PLAS.

Witnesses:
L. PARETTE,
CHAS. ROY NASMITH.